(12) United States Patent
Kang et al.

(10) Patent No.: US 10,270,098 B2
(45) Date of Patent: Apr. 23, 2019

(54) POSITIVE ELECTRODE ACTIVE MATERIAL FOR LITHIUM ION BATTERY, CONTAINING LITHIUM VANADIUM ZIRCONIUM PHOSPHATE, AND LITHIUM ION BATTERY COMPRISING SAME

(71) Applicant: Dongguk University Industry-Academic Cooperation Foundation, Seoul (KR)

(72) Inventors: Yong-mook Kang, Seoul (KR); Seung-ho Kang, Iksan-si (KR); Dong-wook Han, Jinju-si (KR)

( * ) Notice: Subject to any disclaimer, the term of this patent is extended or adjusted under 35 U.S.C. 154(b) by 206 days.

(21) Appl. No.: 15/309,248

(22) PCT Filed: Apr. 23, 2015

(86) PCT No.: PCT/KR2015/004046
§ 371 (c)(1),
(2) Date: Nov. 7, 2016

(87) PCT Pub. No.: WO2015/174652
PCT Pub. Date: Nov. 19, 2015

(65) Prior Publication Data
US 2017/0062824 A1 Mar. 2, 2017

(30) Foreign Application Priority Data

May 16, 2014 (KR) .................. 10-2014-0059070

(51) Int. Cl.
*H01M 4/02* (2006.01)
*H01M 4/04* (2006.01)
(Continued)

(52) U.S. Cl.
CPC ........... *H01M 4/5825* (2013.01); *C01B 25/45* (2013.01); *H01M 4/0471* (2013.01); *H01M 4/13* (2013.01);
(Continued)

(58) Field of Classification Search
CPC ............ H01M 4/13; H01M 4/68; H01M 4/62; H01M 4/625; H01M 4/366
See application file for complete search history.

(56) References Cited

U.S. PATENT DOCUMENTS

2011/0027663 A1* 2/2011 Ohkubo ............... H01M 4/485
429/326
2012/0219862 A1* 8/2012 Fujino ................ C01B 35/1027
429/231.5
(Continued)

FOREIGN PATENT DOCUMENTS

JP 2000086215 A * 3/2000
JP 2013-084449 5/2013
(Continued)

OTHER PUBLICATIONS

Machine translation of JP 2000-086215A (Oct. 22, 2018) (Year: 2018).*
(Continued)

*Primary Examiner* — Matthew J Merkling
(74) *Attorney, Agent, or Firm* — Antonio Ha & U.S. Patent, LLC

(57) ABSTRACT

The present invention relates to a positive electrode active material for a lithium ion battery and, more specifically, to a positive electrode active material for a lithium ion battery, having improved initial capacitance and charging and discharging efficiency due to increased electrical conductivity or ion conductivity. The positive electrode active material for a lithium ion battery of the present invention contains lithium vanadium phosphate ($Li_3V_2(PO_4)_3$) and lithium zirconium phosphate ($Li_3Zr_2(PO_4)_3$) formed on an external surface of the lithium vanadium phosphate. The positive electrode active material for a lithium ion battery comprising lithium vanadium zirconium phosphate ($Li_3V_{2-x}Zr_x(PO_4)_3$) particles, which is prepared by a preparation method of the
(Continued)

present invention, has excellent structural stability and ion conductivity as well as high capacitance.

4 Claims, 7 Drawing Sheets

(51) Int. Cl.
| | |
|---|---|
| *H01M 4/13* | (2010.01) |
| *H01M 4/36* | (2006.01) |
| *H01M 4/58* | (2010.01) |
| *H01M 4/62* | (2006.01) |
| *C01B 25/45* | (2006.01) |
| *H01M 4/136* | (2010.01) |
| *H01M 10/052* | (2010.01) |
| *H01M 4/1397* | (2010.01) |
| *H01M 10/0525* | (2010.01) |

(52) U.S. Cl.
CPC ......... *H01M 4/136* (2013.01); *H01M 4/1397* (2013.01); *H01M 4/366* (2013.01); *H01M 4/58* (2013.01); *H01M 4/62* (2013.01); *H01M 4/625* (2013.01); *H01M 10/052* (2013.01); *H01M 10/0525* (2013.01); *C01P 2004/82* (2013.01); *C01P 2006/40* (2013.01); *H01M 2004/028* (2013.01)

(56) References Cited

U.S. PATENT DOCUMENTS

| | | | | |
|---|---|---|---|---|
| 2012/0308893 | A1* | 12/2012 | Fujino | ..................... C01B 25/37 |
| | | | | 429/221 |
| 2013/0193914 | A1* | 8/2013 | Gaddam | ................. H02J 7/007 |
| | | | | 320/108 |
| 2016/0072132 | A1* | 3/2016 | Liao | ....................... H01M 4/131 |
| | | | | 429/50 |

FOREIGN PATENT DOCUMENTS

| | | |
|---|---|---|
| KR | 10-2011-0021384 | 3/2011 |
| KR | 10-1097546 | 12/2011 |
| KR | 10-2013-0095796 | 8/2013 |

OTHER PUBLICATIONS

English translation of 2013-084449.
English translation of 10-2011-0021384.
M. Ren et al., Preparation and electrochemical studies of Fe-doped Li3V2(PO4)3 cathode materials for lithium-ion batteries. J. of Power Sources 162 (2006) 1357-1362.
M. Sato et al., Enhancement of discharge capacity of Li3V2(PO4)3 by stabilizing the orthorhombic phase at room temperature. Solid State Ionics 135 (2000) 137-142.
English translation of 10-1097546.
English translation of 10-2013-0095796.

* cited by examiner

[Fig. 1]
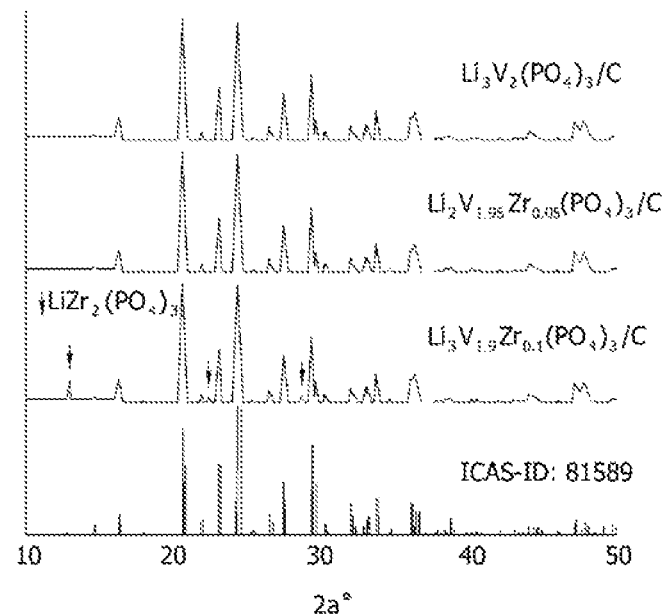
[Fig. 2]
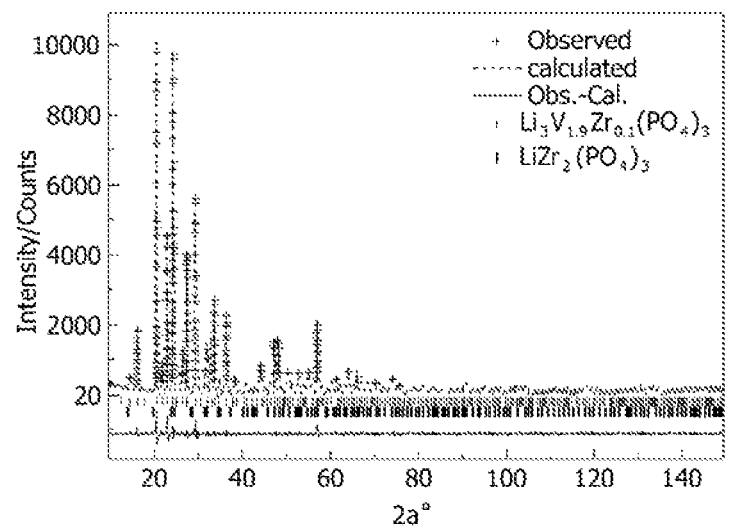

[Fig. 3]
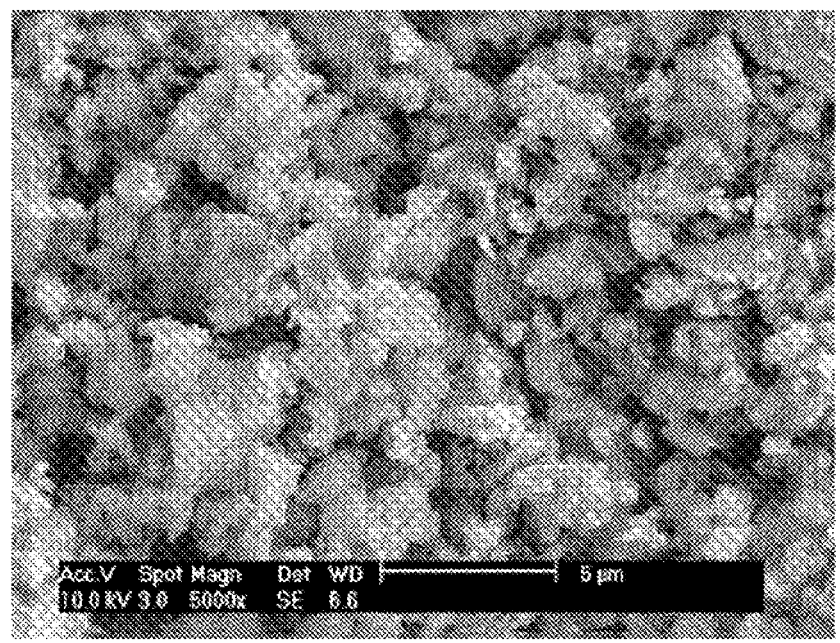
[Fig. 4]
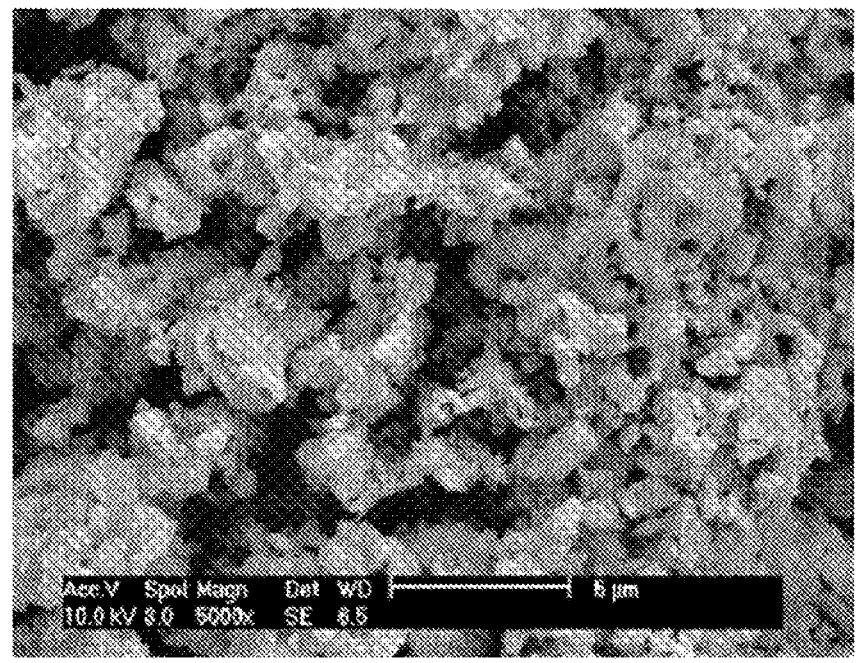

[Fig. 5]
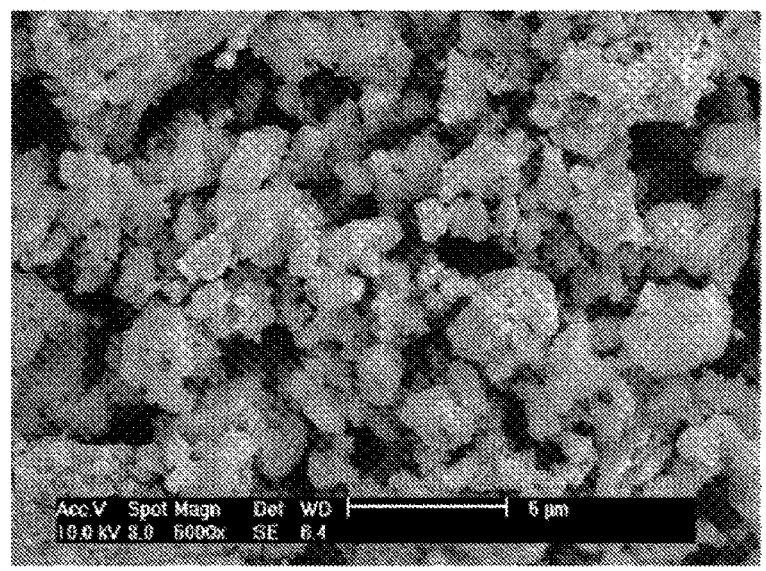
[Fig. 6]
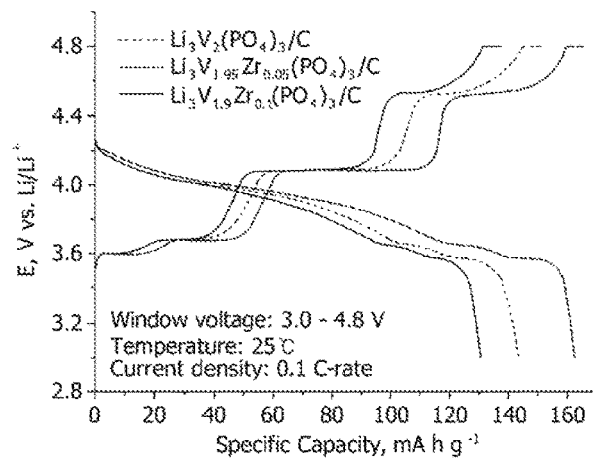
[Fig. 7]
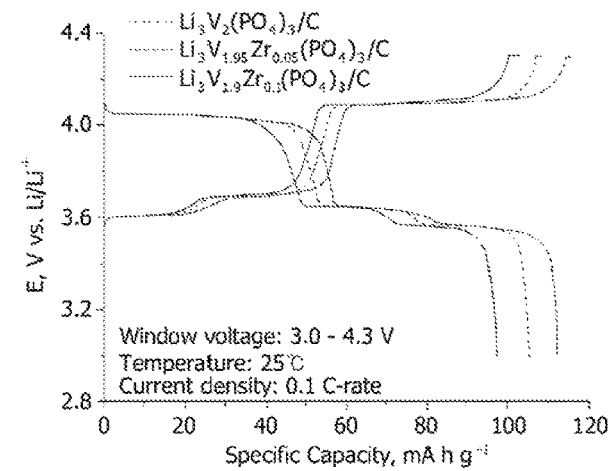

[Fig. 8]
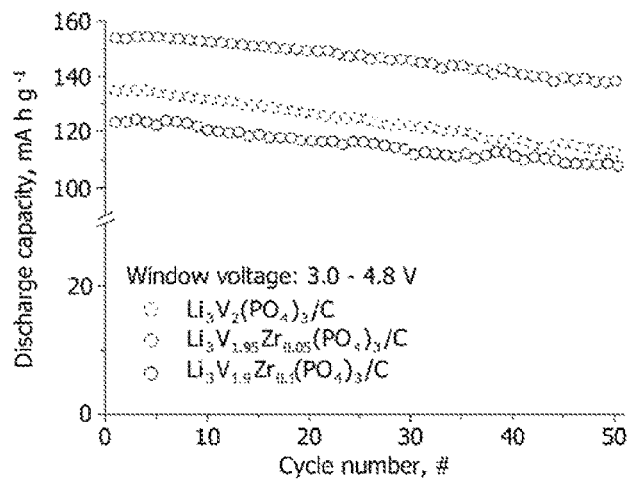
[Fig. 9]
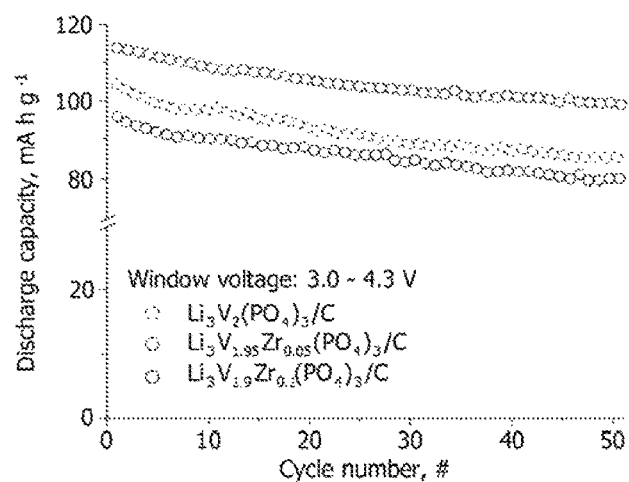
[Fig. 10]
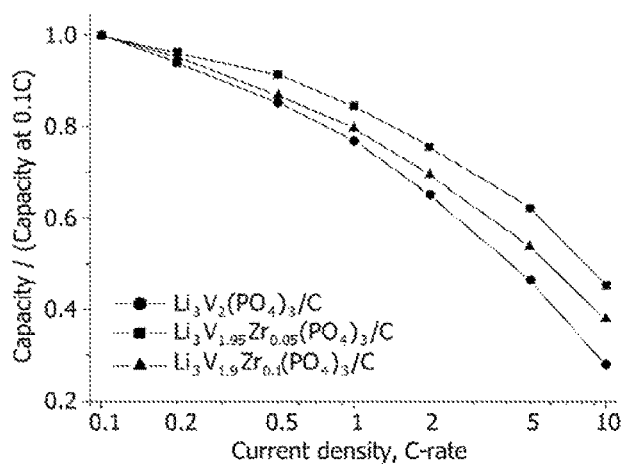

[Fig. 11]
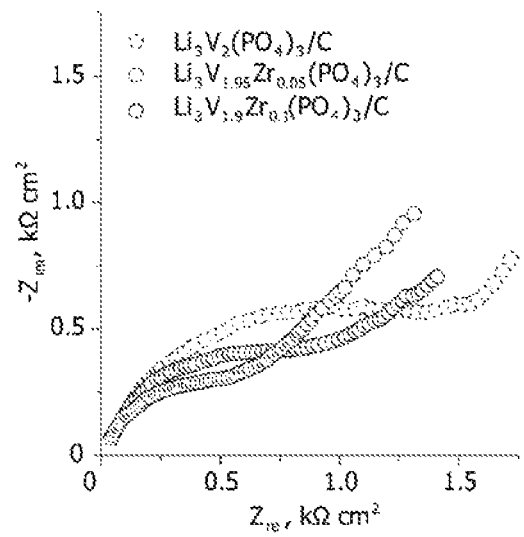
[Fig. 12]
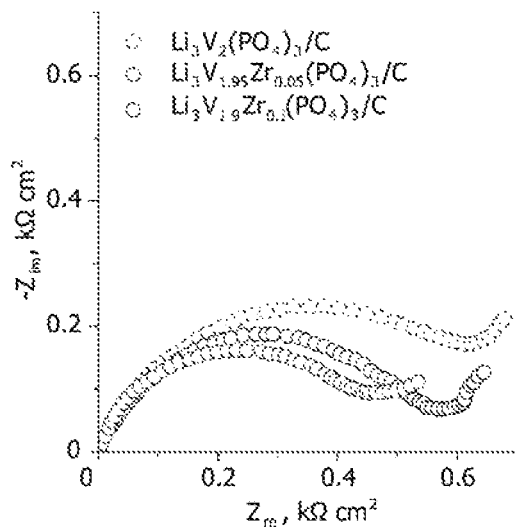

[Fig. 13]
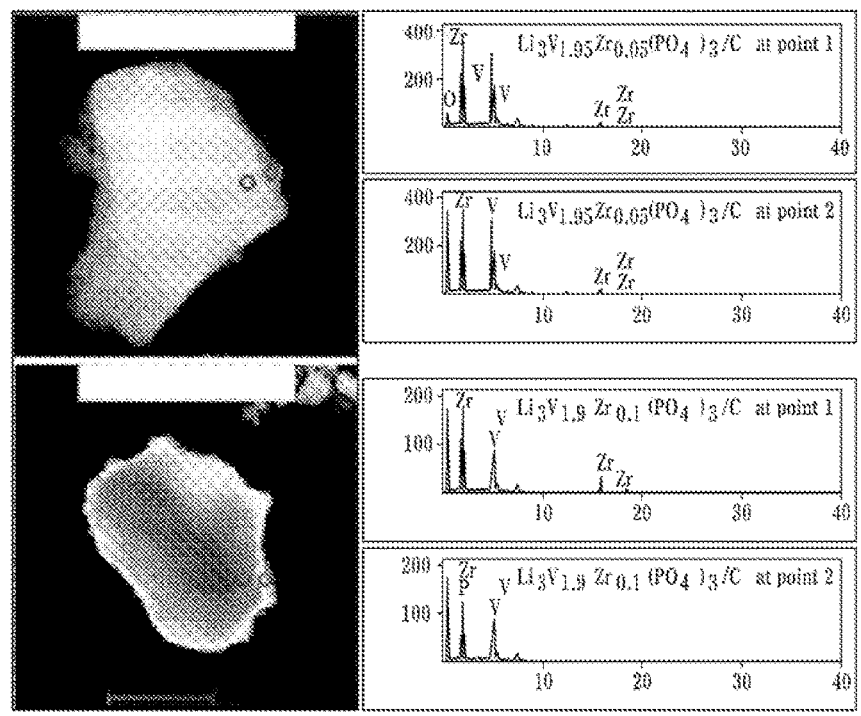
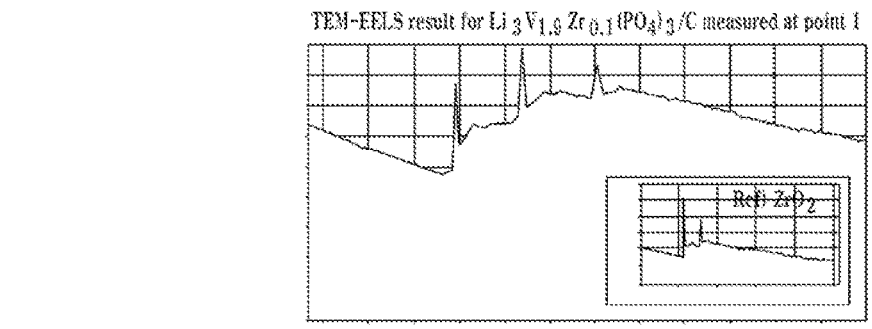
[Fig. 14]
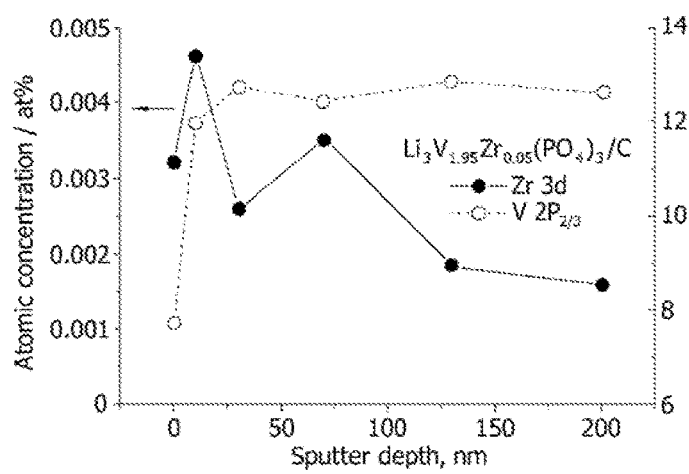

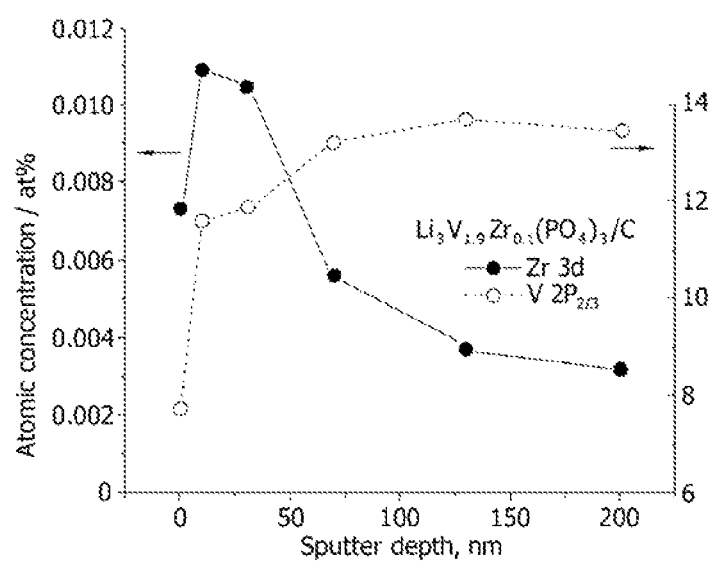
[Fig. 15]

POSITIVE ELECTRODE ACTIVE MATERIAL FOR LITHIUM ION BATTERY, CONTAINING LITHIUM VANADIUM ZIRCONIUM PHOSPHATE, AND LITHIUM ION BATTERY COMPRISING SAME

CROSS-REFERENCE TO RELATED APPLICATIONS

This patent application is a national-stage application of International Patent Application No. PCT KR2015/004046 filed on Apr. 23, 2015, which claims priority under 35 U.S.C. § 119 to Korean Patent Application No. 10-2014-0059070), filed on May 16, 2014, in the Korean Intellectual Property Office, the disclosure of which is incorporated by reference herein in its entirety.

TECHNICAL FIELD

The present invention relates to a positive electrode active material for a lithium ion battery and, more specifically, to a positive electrode active material for a lithium ion battery, having an improved initial capacity and charging and discharging efficiency due to an increased electrical conductivity or ion conductivity.

DISCUSSION OF RELATED ART

Recently, resource and environmental issues, such as depletion of fossil fuel and global warming, are raised so that new renewable energy attracts great attention.

Because high-output and density, large-scale energy storage devices are required in the industries of electric vehicles (EV), hybrid electric vehicles (HEVs), portable electric storage devices, and power distributor, the development of batteries meeting such demand is at issue in the industry.

Lithium ion batteries featuring a high energy density such as 75 Wh/kg to 160 Wh/kg and long lifespan are leading the secondary battery industry, beating nickel-cadmium batteries and nickel-hydrogen batteries that have been developed earlier.

As a new positive electrode material for the lithium ion battery, fluorinated lithium metal phosphate ($Li_2M(M=Fe, Mn, Co, Ni)PO_4F$), lithium metal silicate ($Li_2MSiO_4$), and lithium metal phosphate ($Li_3M_2(PO_4)_3$) are mainly used, where two or more Li+ ions may be intercalated or deintercalated into from a parent structure.

Among others, lithium vanadium phosphate ($Li_3V_2(PO_4)_3$) has a high theoretical capacity (197 mAh/g) and an average oxidation-reduction voltage of 4.0 V, but due to its low inherent electric conductivity, it is not suitable for industrial use. In order to make up for such weakness of lithium vanadium phosphate ($Li_3V_2(PO_4)_3$), conductive carbon coating or nanostructure has been suggested as a solution but lacks practicability.

The present invention is to provide an electrode material with an increased ion conductivity and enhanced electrochemical property that may be obtained by subjecting lithium vanadium phosphate ($Li_3V_2(PO_4)_3$) to zirconium substitution to stabilize the phosphate crystal structure while forming a small amount of the ion conductor, $LiZr_2(PO_4)_3$, on the surface of the phosphate particles.

PRIOR ART DOCUMENT

Patent Document (Patent Document 1) KR10-1097546
(Patent Document 2) KR10-2013-0095796

SUMMARY

The present invention aims to provide a positive electrode active material for a lithium ion battery, comprising zirconium-substituted lithium vanadium zirconium phosphate ($Li_3V_{2-x}Zr_x(PO_4)_3$) that may provide an excellent electrochemical property by increasing the structural stability and ion conductivity.

The present invention also aims to provide a positive electrode of lithium ion battery and a lithium ion battery including the positive electrode active material for a lithium ion battery.

The present invention is to provide a positive electrode active material of lithium ion battery that comprises lithium vanadium phosphate ($Li_3V_2(PO_4)_3$); and lithium vanadium zirconium phosphate ($Li_3V_{2-x}Zr_x(PO_4)_3$) formed on an outer surface of the lithium vanadium phosphate.

A portion of vanadium of the lithium vanadium phosphate may be substituted with zirconium.

The positive electrode active material may be expressed as a following chemical formula 1:

$$(Li_3V_{2-x}Zr_x(PO_4)_3) \qquad \text{[Chemical Formula 1]}$$

wherein x is a real number greater than 0 and less than or equal to 1.

The positive electrode active material may be prepared by a method comprising following steps of: adding a carbon precursor, a lithium precursor, a vanadium precursor, a zirconium phosphate, and a phosphorous precursor to a solvent and then mixing them ("S1"); drying a mixture prepared in the step S1 to produce a dried powder ("S2"); and thermally treating the dried powder ("S3").

The carbon precursor preferably comprises one or more selected from the group of consisting of sucrose, citric acid, malic acid, and tartaric acid.

The lithium precursor preferably comprises one or more selected from the group consisting of lithium carbonate, lithium hydroxide, lithium acetate, lithium nitrate, and lithium acetylacetonate.

The vanadium precursor preferably comprises one or more selected from the group consisting of vanadium pentoxide, vanadium dioxide, vanadium chloride, and vanadyl acetylacetonate.

The zirconium precursor preferably comprises one or more selected from the group consisting of zirconium hydroxide, zirconium acetate, and zirconium nitride.

The phosphorous precursor preferably comprises one or more selected from the group consisting of ammonium dihydrogen phosphate and phosphoric acid.

One or more selected from the group consisting of an aluminum precursor, a molybdenum precursor, and a chrome precursor may be further added in the step S1.

The step S2 may comprise drying the mixture prepared in the step S1 at 100° C. to 150° C. for 6 hours to 12 hours.

The step S3 is preferably performed in reducing atmosphere.

The step S3 may comprise thermally treating the dried powder at 650° C. to 850° C. for 6 hours to 48 hours.

The step S3 may comprise performing a first thermal treatment on the dried powder at 110° C. to 120° C. for 1 hour to 6 hours, performing a second thermal treatment on the dried powder at 500° C. to 550° C. for 6 hours to 12 hours, and performing a third thermal treatment on the dried powder at 650° C. to 850° C. for 6 hours to 24 hours.

The present invention is also to provide a positive electrode including the positive electrode active material and a lithium ion battery thereof.

A positive electrode active material for a lithium ion battery including zirconium-doped lithium vanadium zirconium phosphate ($Li_3V_{2-x}Zr_x(PO_4)_3$) particles, prepared by a method according to the present invention, has a high capacity and an increased structural stability and ion conductivity, resultantly providing on excellent electrochemical property.

BRIEF DESCRIPTION OF THE DRAWINGS

FIGS. 1 and 2 are graphs illustrating results of x-ray diffraction analysis and Rietveld analysis for lithium vanadium zirconium phosphate ($Li_3V_{2-x}Zr_x(PO_4)_3$) composite particle made in accordance with an embodiment 1 of the present invention;

FIGS. 3 to 5 are scanning electron microscope images for lithium vanadium zirconium phosphate and lithium vanadium phosphate;

FIGS. 4 to 10 are graphs illustrating results of electrochemical analysis for an experiment 1;

FIGS. 11 and 12 are graphs illustrating results of impedance curve analysis for an experiment 4;

FIG. 13 illustrates images and graphs for Zr, V, and P contents on the surface of and inside lithium vanadium zirconium phosphate ($Li_3V_{2-x}Zr_x(PO_4)_3$) composite particles where x=0.05 and 0.1 respectively; and FIGS. 14 and 15 graphs illustrating results of x-ray photoelectron spectroscopy analysis for lithium vanadium zirconium phosphate ($Li_3V_{2-x}Zr_x(PO_4)_3$) composite particle according to the embodiment 1 of the present invention.

DETAILED DESCRIPTION OF EXEMPLARY EMBODIMENTS

Hereinafter, the present invention is described in detail. Known components or functions may be excluded from the description.

Words or terms used in the present specification and claims are not construed to be limited to the ordinary or dictionary meanings and should be construed based on the meanings and concepts corresponding to technical aspects of the present invention.

Embodiments described in the specification and configurations shown in the drawings are preferable embodiments of the present invention and do not represent all of the technical features of the present invention so that there may be, as of the time of filing, other various equivalents and modifications which may replace the same.

A positive electrode active material of lithium ion battery according to the present invention comprises lithium vanadium phosphate ($Li_3V_2(PO_4)_3$) and lithium zirconium phosphate ($LiZr_2(PO_4)_3$) formed on the outer surface of the lithium vanadium phosphate, and zirconium is substituted for a portion of vanadium in the lithium vanadium phosphate.

In other words, in the positive electrode active material of lithium ion battery of the present invention, Zr is doped on the lithium vanadium phosphate so that $LiZr_2(PO_4)_3$, a Li ion conductor, is formed on the surface thereof, thus increasing Li ion conductivity, and on the inside thereof, Zr4+ doping on a portion of V sites suppresses V3+-V4+ redox to increase structural stability.

The positive electrode active material of lithium ion battery of the present invention may be expressed by chemical formula 1 as below.

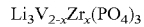   [Chemical Formula 1]

(where x is a real number more than 0 and equal or less than 1)

A positive electrode active material of lithium ion battery of the present invention may further comprise a carbon-containing material which is a carbon precursor remaining in the process of preparing the positive electrode active material.

A positive electrode active material of lithium ion battery of the present invention may be fabricated by a method comprising the following steps: the step ("S1") of adding a carbon precursor, a lithium precursor, a vanadium precursor, a zirconium precursor, and a phosphorous precursor to a solvent and then mixing them; the step ("S2") of drying the mixture prepared in the step S1 to produce a dried powder; and the step 3 ("S3") of thermally treating the dried powder.

Hereafter, a method of preparing a positive electrode active material of lithium ion battery of the present invention is described stepwise in detail.

First, a carbon precursor, a lithium precursor, a vanadium precursor, a zirconium precursor, and a phosphorous precursor are added to a solvent, and they are then mixed (S1).

As the carbon precursor, preferably one or more selected from the group consisting of sucrose, citric acid, malic acid and tartaric acid may be used.

Less than 1 wt % of the carbon precursor remains after the preparing process and functions as an active agent to form a $LiZr_2(PO_4)_3$ layer on the surface thereof. The carbon precursor, as a reductant, suppresses oxidation of V in lithium vanadium phosphate ($Li_3V_2(PO_4)_3$) to contribute to the formation of excellent crystalline $Li_3V(PO_4)_3$. After a thermal treatment in a corresponding temperature range (650° C. to 750° C.), residual carbon increases electric conductivity. Meanwhile, if Zr-substituted $Li_3V_{2-x}Zr_x(PO_4)_3$ exceeds a solubility limit (presumably less than 5 at %) of Zr which may be positioned in V's site, little or no carbon (less than 1 weight %) remains, from which it may be verified that such addition of the carbon precursor acts as an active agent so that extra residual Zr not being positioned in V's site is made into $LiZr_2(PO_4)_3$ ion conductor formed on the surface of the lithium vanadium zirconium phosphate $Li_3V_{2-x}Zr_x(PO_4)_3$ particle.

As the lithium precursor, one or more selected from the group consisting of
lithium carbonate, lithium hydroxide, lithium acetate, lithium nitrate, and lithium acetylacetonate may preferably be used.

As the vanadium precursor, one or more selected from consisting the group of vanadium pentoxide, vanadium dioxide, vanadium chloride, and vanadyl acetylacetonate may preferably be used.

As the zirconium precursor, one or more selected from the group consisting of zirconium hydroxide, zirconium acetate, and zirconium nitride may preferably be used.

As the phosphorous precursor, one or more selected from the group consisting of ammonium dihydrogen phosphate and phosphoric acid may preferably be used.

The lithium precursor, the vanadium precursor, the zirconium precursor, and phosphorous precursor are preferably added in a molecular ratio of 3:2-x:x:3 (0<x<1). The carbon precursor is preferably added in a 3 weight % to 10 weight % ratio relative to a final target weight of $Li_3V_{2-x}Zr_x(PO_4)_3$.

Upon production of a mixed solution in the present step, one or more additives selected from the group consisting of an aluminum precursor, a molybdenum precursor, and a chrome precursor may be added in addition to the lithium precursor, the vanadium precursor, the zirconium precursor, and phosphorous precursor whereby a final product as prepared by the fabrication method according to the present invention comprises aluminum, molybdenum, or chrome that may lead to a further enhancement in structural stability and ion conductivity than is achievable by Zr substitution.

Next, the mixture prepared in step S1 is dried into a dried powder (S2).

The instant step may be performed by drying the mixture prepared in step S1 at 100° C. to 150° C. for 6 hours to 12 hours.

When the drying temperature is greater than the upper limit of the range, the properly of the precursors may be changed or transition metal may be oxidized. When the drying temperature is less than the low limit of the range, it is not preferred because the solvent may not completely be evaporated.

Next, the dried powder prepared in step S2 is thermally treated (S3).

Step S3 may be reformed by thermally treating the dried powder at 650° C. to 850° C. for 6 hours to 48 hours.

When the temperature of the thermal treatment is greater than the upper limit of the range, a new phase transition may occur at the high temperature, or a second phase may occur as impurities so that the crystal structure of $Li_3V_{2-x}Zr_x(PO_4)_3$ may be destructed. When the temperature is less than the low limit of the range, it is not preferred because $Li_3V_{2-x}Zr_x(PO_4)_3$ may form no phase or present a low crystallizibility, failing to obtain excellent electrochemical properties.

Step S3 may be carried out by performing a first thermal treatment on the dried powder at 110° C. to 120° C. for 1 hour to 6 hours, a second thermal treatment thereon at 500° C. to 550° C. for 6 hours to 12 hours, and a third thermal treatment thereon at 650° C. to 850° C. for 6 hours to 24 hours.

Such three steps of thermal treatments may eliminate moisture during the first thermal treatment and remove hetero-bonds (e.g., —OH, —COOH, $NO_3$, or $SO_4$) attached to the lithium precursor, the vanadium precursor, the zirconium precursor, and phosphorous precursor during the second thermal treatment, thereby allowing $Li_3V_{2-x}Zr_x(PO_4)_3$ an even purer, higher crystalline final phase.

The instant step is preferably performed in a reducing atmosphere.

Hereafter, it should be appreciated by one of ordinary skill in the art that, although preferable embodiments of the present invention are provided for a better understanding of the present invention, the embodiments are merely provided as examples, and various chances or modifications may be made thereto within the technical scope and spirit of the present invention and such changes or modifications also belong to the appended claims.

<Embodiment 1> Preparation of a Lithium Vanadium/Zirconium Phosphate $Li_3V_{2-x}Zr_x(PO_4)_3$ Composite Lithium carbonate, as a lithium precursor, vanadium pentoxide, as a vanadium precursor, zirconium hydroxide, as a zirconium precursor, and ammonium dihydrogen phosphate, as a phosphorous precursor, were added to a solution where ethanol/deionized water (DI) and sucrose, as a carbon precursor, had been stirred up, and were then stirred at room temperature for 6 hours, preparing a mixed solution. Here, the zirconium precursor was added in 0.05 molecular ratio (mol %) and 0.1 molecular ratio (mol %) each.

In order to eliminate organic matters, the prepared solution was dried in a vacuum atmosphere at 120° C. for 12 hours to prepare a mixed powder of the precursors.

Next, the prepared mixed powder was thermally treated in a reducing atmosphere such as $Ar/H_2(95:5)$, at 750° C. for 10 hours, forming a lithium vanadium zirconium phosphate $Li_3V_{2-x}Zr_x(PO_4)_3$ composites (x=0.05 and 0.1) according to the present invention.

<Experimental Example 1> X-Ray Diffraction Analysis and Rietveld Structure Refinement To order to analyze the structure of lithium vanadium zirconium phosphate $Li_3V_{2-x}Zr_x(PO_4)_3$ composite particles according to embodiment 1, X-ray diffraction was performed and a result thereof was illustrated in FIG. 1. Rietveld structure refinement was also performed and a result thereof was illustrated in FIG. 2.

As illustrated in FIG. 1, the lithium vanadium zirconium phosphate $Li_3V_{2-x}Zr_x(PO_4)_3$, x=0.05) composite of the present invention shows distinguishable peaks of lithium vanadium phosphate ($Li_3V_2(PO_4)_3$) at 16.39 degrees (211), 20.07 degrees (11-2), 23.13 degrees (210), 24.39 degrees (10-3), 27.49 degrees (12-2), 29.39 degrees (220), 33.80 degrees (105), 47.31 degrees (114), and 47.46 degrees (332). In the other hand, for the lithium vanadium zirconium phosphate ($Li_3V_{2-x}Zr_x(PO_4)_3$, x=0.1) composite with x=1, a lithium zirconium phosphate (LiZr2(PO4)3) phase, as an additional second phase, shows distinguishable peaks at 2θ angles, such as 12.22 degree (101), 23.44 degree (11-3), and 28.33 degree (024).

As illustrated in FIG. 2, the lithium vanadium zirconium phosphate ($Li_3V_{1.95}Zr_{0.05}(PO_4)_3$) composite where x=0.05 formed a small amount of lithium zirconium phosphate ($LiZr_2(PO_4)_3$) phase inside the structure thereof.

<Experimental Example 2> Scanning Electron Microscopy

In order to analyze the shape of the lithium vanadium zirconium phosphate (Li3V2-xZrx(PO4)3) particles according to embodiment 1, scanning electron microscopy was performed thereon, results of which were illustrated in FIGS. 3 to 5.

As illustrated in FIGS. 3 and 4, the lithium vanadium/zirconium phosphate ($Li_3V_{2-x}Zr_x(PO_4)_3$, x=0.05 and 0.1) composites were formed well in the shape of micro particles. As evident from FIG. 5, lithium vanadium phosphate ($Li_3V_2(PO_4)_3$) particles were shown to have similar particle shapes.

The results may show that the lithium vanadium zirconium phosphate ($Li_3V_{2-x}Zr_x(PO_4)_3$) particles according to the present invention remain well in shape.

<Experimental Example 3> Evaluation of Electrochemical Properties

Electrochemical analysis results of lithium vanadium zirconium phosphate (Li3V2-xZrx(PO4)3) according to embodiment 1 were illustrated in FIGS. 6 to 11. Lithium ion batteries prepared using the positive active materials prepared according to embodiment 1 were charged/discharged with 0.1 C at 3.0V to 4.3V and 3.0V to 4.8V, respectively, and then results of charging/discharging properties thereof were illustrated in FIGS. 6 and 7. Further, under the reference or 0.1 C at 3.0V to 4.3V and 3.0V to 4.8V, 50 cycles of charging/discharging were performed, and results of measuring charging/discharging propones were illustrated in FIGS. 8 and 9. Lastly, charging/discharging was carried out with 0.1 C, 0.2 C, 0.5 C, 1 C, 2 C, 5 C and 10 C at 3.0V to 4.3V and results of the measurement of charging/discharging properties were illustrated in FIG. 10.

As illustrated in FIG. 6, at 3.0V to 4.3V, the lithium vanadium zirconium phosphate ($Li_3V_{1.95}Zr_{0.05}(PO_4)_3$) composite where X=0.05 presents an increased initial capacity as compared with the lithium vanadium phosphate ($Li_3V_{1.9}Zr_{0.1}(PO_4)_3$) where X=0.1 and they show the same oxidation/reduction reaction. As a comparison group, lithium vanadium phosphate ($Li_3V_2(PO_4)_3$) was assessed, and results were also illustrated in FIG. 6.

As illustrated in FIG. 7, at 3.0V to 4.8V, the lithium vanadium zirconium phosphate ($Li_3V_{1.95}Zr_{0.05}(PO_4)_3$) composite where X=0.05 presents an increased initial capacity as compared with the lithium vanadium phosphate ($Li_3V_{1.9}Zr_{0.1}(PO_4)_3$) at X=0.1 and they result in the same oxidation/reduction reaction. As a comparison group, lithium vanadium phosphate ($Li_3V_2(PO_4)_3$) was assessed and results were illustrated together in FIG. 7.

FIG. 8 illustrated lifespan properties upon charging/discharging with 0.1 C at 3.0V to 4.3V, whereby it could be verified that a lithium ion battery using a lithium vanadium zirconium phosphate ($Li_3V_{1.95}Zr_{0.05}(PO_4)_3$) composite where X=0.05 presented an increased lifespan as compared with one using a lithium vanadium phosphate ($Li_3V_{1.9}Zr_{0.1}(PO_4)_3$) composite at X=0.1.

FIG. 9 illustrated lifespan properties upon charging/discharging with 0.1 C at 3.0V to 4.8V, whereby it could be verified that a lithium ion battery using a lithium vanadium zirconium phosphate ($Li_3V_{1.95}Zr_{0.05}(PO_4)_3$) composite where X=0.05 presented an increased lifespan as compared with one using a lithium vanadium phosphate ($Li_3V_{1.9}Zr_{0.1}(PO_4)_3$) composite at X=0.1.

To evaluate changes in capacity in accordance with discharge rates of lithium vanadium zirconium phosphate (Li3V2-xZrx(PO4)3) composites prepared by the above-described embodiments, discharge curves were analyzed and illustrated in FIG. 10. As a comparison group, a discharge curve of lithium vanadium phosphate (Li3V2(PO4)3) was also illustrated in FIG. 10.

As illustrated in FIG. 10, the lithium vanadium phosphate ($Li_3V_2(PO_4)_3$), as a comparison group, presented a relatively further reduced capacity as the discharge rate (C-rate) increased from 0.1 C to 10 C. In contrast, the lithium vanadium zirconium phosphate ($Li_3V_{2-x}Zr_x(PO_4)_3$) composite of the present invention showed a tiny reduction in capacity as the discharge rate increased.

<Experimental Example 4> Analysis of Impedance Curve

Before and after discharging a half-cell prepared using a positive active material with 0.1 C, Nyquist characteristics were measured at 0.01V, 0.1 Hz to 10 kHz, and results thereof were illustrated in FIGS. 11 and 12. As a comparison group, Nyquist characteristics of lithium vanadium phosphate ($Li_3V_2(PO_4)_3$) were illustrated in FIGS. 11 and 12.

As illustrated in FIG. 11, as a result of putting lithium vanadium zirconium phosphate ($Li_3V_{1.95}Zr_{0.05}(PO_4)_3$) composite where X=0.05 and lithium vanadium zirconium phosphate ($Li_3V_{1.9}Zr_{0.1}(PO_4)_3$) composite where X=0.1 under an operation of the same circuit before the 50 cycles of charging/discharging, the lithium vanadium zirconium phosphate ($Li_3V_{1.95}Zr_{0.05}(PO_4)_3$) composite where X=0.05 exhibited a farther increased Li+ conductivity as compared with lithium vanadium zirconium phosphate ($Li_3V_{1.9}Zr_{0.3}(PO_4)_3$) composite where X=0.1, thus reducing the section of charge transfer, and therefore, its resistance decreased.

As illustrated in FIG. 12, as a result of putting the lithium vanadium zirconium phosphate ($Li_3V_{1.95}Zr_{0.05}(PO_4)_3$) composite where X=0.05 and lithium vanadium zirconium phosphate ($Li_3V_{1.95}Zr_{0.1}(PO_4)_3$) composite where X=0.1 under an operation of the same circuit after the 50 cycles of charging/discharging, the lithium vanadium zirconium phosphate ($Li_3V_{1.95}Zr_{0.05}(PO_4)_3$) composite where X=0.05 exhibited a more increase in Li+ conductivity as compared with lithium vanadium zirconium phosphate ($Li_3V_{1.9}Zr_{0.1}(PO_4)_3$) composite where X=0.1, thus reducing the section of charge transfer and resultantly decreasing resistance.

From the above results, the lithium vanadium zirconium phosphate ($Li_3V_{2-x}Zr_x(PO_4)_3$) of the present invention has a reduced resistance in the charge transfer section, i.e., a portion between an electrolyte and an active material, and resultantly has an increased Li+ conductivity as compared with lithium vanadium phosphate ($Li_3V_2(PO_4)_3$), as a comparison group, thereby allowing the characteristics illustrated in FIGS. 11 and 12 to be identified clearly. Therefore, it can be verified that the lithium vanadium zirconium phosphate ($Li_3V_{2-x}Zr_x(PO_4)_3$) of the present invention was suitable for a positive active material of lithium ion battery, which is advantageous to high speed charge/discharge.

<Experimental Example 5> Analysis or Transmission Electron Microscope-Electron Energy Loss Spectroscopy (EELS)

Result of transmission electron microscope-EELS analysis of the lithium vanadium zirconium phosphate ($Li_3V_{2-x}Zr_x(PO_4)_3$) according to embodiment 1 were illustrated in FIG. 13.

FIG. 13 illustrates Zr, V, and P contents on the surface of and at an inside of lithium vanadium zirconium phosphate ($Li_3V_{2-x}Zr_x(PO_4)_3$) composite particles where x=0.05 and 0.1, where Zr was observed on the surface of, not inside, lithium vanadium zirconium phosphate ($Li_3V_{2-x}Zr_x(PO_4)_3$).

<Experimental Example 6> X-Ray Photoelectron Spectroscopy

Results of X-ray Photoelectron Spectroscopy analysis of the lithium vanadium zirconium phosphate ($Li_3V_{2-x}Zr_x(PO_4)_3$) according to embodiment 1 were illustrated in FIGS. 14 and 15.

As illustrated in FIGS. 14 and 15, Zr contents are indicated to be at high levels on the surface of lithium vanadium zirconium phosphate ($Li_3V_{2-x}Zr_x(PO_4)_3$) where x=0.05 and 0.1 and reduce to the inside of the particles.

From those above results, it can be verified that a lithium vanadium zirconium phosphate ($Li_3V_{2-x}Zr_x(PO_4)_3$) phase formed well on the surface of the particles.

What is claimed is:
1. A positive electrode active material of a lithium ion battery, comprising:
lithium vanadium phosphate ($Li_3V_2(PO_4)_3$); and
lithium vanadium zirconium phosphate ($Li_3V_{2-x}Zr_x(PO_4)_3$) formed on an outer surface of the lithium vanadium phosphate, wherein x is a positive decimal greater than 0 and less than 1, or a positive integer 1.

2. The positive electrode active material of claim 1, wherein a portion of vanadium of the lithium vanadium phosphate is substituted with zirconium.

3. The positive electrode active material of claim 1, further comprising a material including carbon.

4. A positive electrode of a lithium ion battery comprising the positive electrode active material of claim 1.

* * * * *